L. T. MASON.
GATES.
No. 194,876. Patented Sept. 4, 1877.
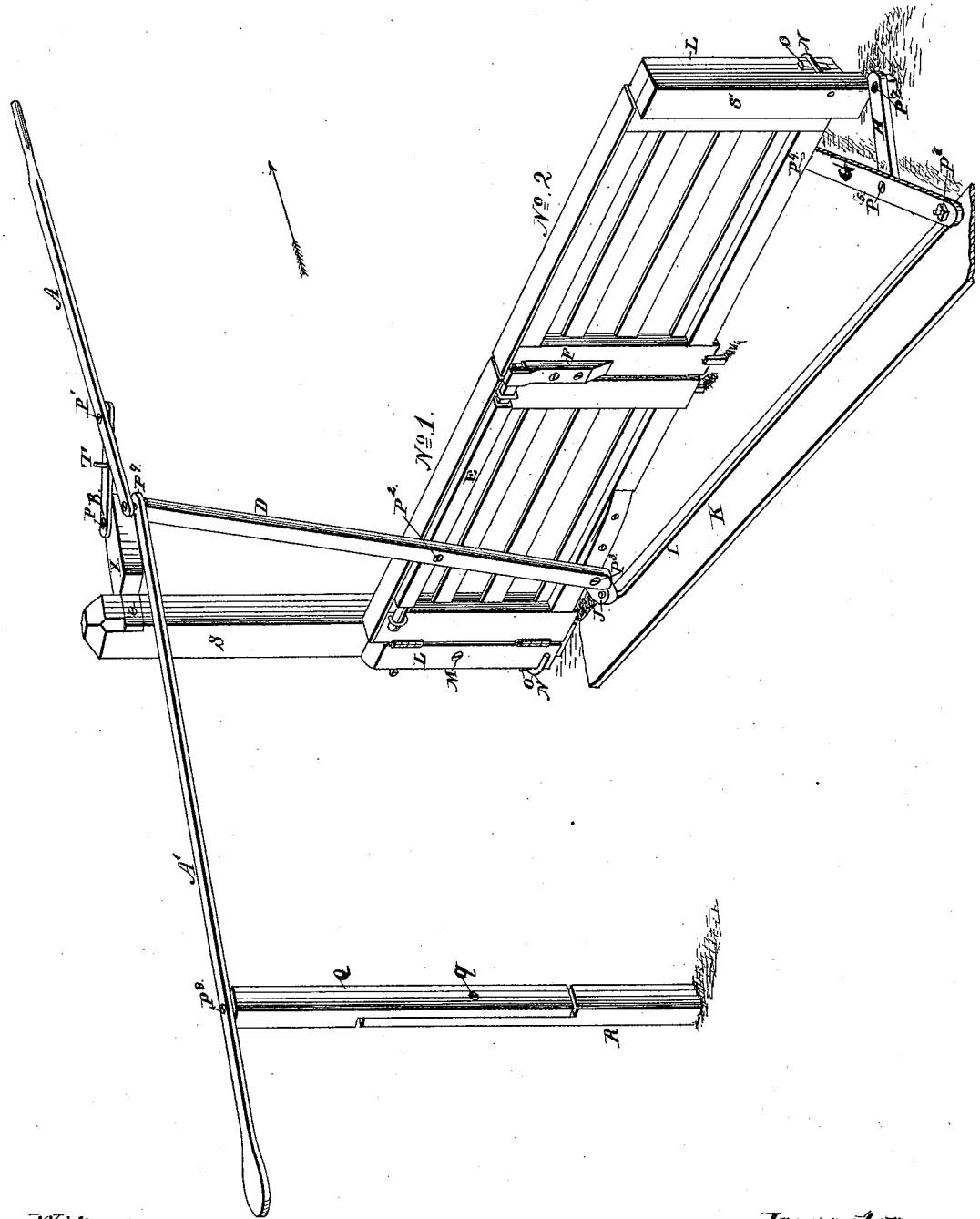
Witnesses:
S. A. Bates
C. E. Ollett
Inventor
Lewis T. Mason

UNITED STATES PATENT OFFICE.

LEWIS T. MASON, OF ELLINGTON, NEW YORK.

IMPROVEMENT IN GATES.

Specification forming part of Letters Patent No. 194,876, dated September 4, 1877; application filed May 14, 1877.

*To all whom it may concern:*

Be it known that I, L. T. MASON, of Ellington, in the county of Chautauqua and State of New York, have invented a new and Improved Gate-Opener; and I do hereby declare that the following is a full, clear, and exact description of the same, reference being had to the accompanying drawing, forming part of this specification, in which the figure is a perspective view.

The object of my invention is to provide an improved device for unlatching and opening and for closing and latching a gate in a simple and convenient manner without descending from the vehicle.

The invention belongs to that class of gates in which there are two gates connected for simultaneous movement, and arranged to swing the one in and the other out, to open the gateway for the passage of the vehicle; and it consists in certain improvements upon said form of gate, as hereinafter fully described, and pointed out in the claims.

In the drawing, S S' represent the two gate-posts, of which S is extended upwardly to a height of about seven feet. Near the top of this post is attached a horizontally-projecting support, X, to which is pivoted at P an arm, T, and to the outer or free end of which arm is pivoted at $P^1$ one of the horizontally-projecting hand-levers A. Upon the opposite side of the gate is a similar hand-lever, A', which is pivoted at $P^8$ to a lever, Q, which latter is a top section of a post, R, pivoted to the ground-section at $q$. Both these levers A A' are pivoted at $P^9$ to the upper end of a vertical lever, D, and each has both an oscillating and a longitudinal rectilinear movement, the lever A oscillating upon its pivot $P^1$, and moving longitudinally upon the two pivots P $P^1$, while the lever A' oscillates upon its pivot $P^8$ and moves longitudinally upon the pivot $q$.

The lower end of the lever D is pivoted at $P^3$ to the bottom of the gate marked No. 1, and at the top of the gate, and near its middle, is pivoted at $P^2$ to a horizontal sliding bar, E, which moves in staples or keepers on the gate No. 1, and engages with a catch, F, on gate No. 2 to lock the two said gates together when closed. To a projection on the bottom part of the gate No. 1 is pivoted at J an iron rod, I, which runs diagonally across the gateway, and is pivoted at $P^6$ to a bar, G, which latter is pivoted at $P^4$ to gate No. 2, and at its center is pivoted at $P^5$ to a bar, H, which, in turn, is pivoted to a post or fixture in the ground. K is a plank arranged beneath rod I, to prevent it from being mashed into the earth and bent by the vehicle-wheels.

In operating my device, as so far described, in passing through the gate in the direction of the arrow the lever A' is seized by the party in the vehicle, and is first moved on its pivot $P^8$ to deflect lever D on its pivot $P^3$ and throw the locking-bar E on gate No. 1 out of the catch F on gate No. 2, to unlatch the gates. At the same time, or immediately following this movement, the bar A' is drawn back longitudinally upon the pivot $q$, which latter movement produces a lateral strain upon the gate No. 1, which, being unlatched, swings back on its hinges. As soon as gate No. 1 is in line with and begins to pass over rod I it exerts a draft upon the same, which moves bar G upon its pivots $P^5$ $P^7$ laterally against the gate No. 2, and causes it to swing open in the opposite direction from gate No. 1. As soon as the vehicle passes through, a pull is exerted in longitudinal direction upon the bar A, which, through lever D, brings the gates back to their closed position, after which the lever A is turned slightly on its pivot $P^1$ to deflect lever D on its pivot $P^3$, and throw the latch-bar E longitudinally into the catch F to secure the gates in closed position.

To prevent the operating devices from becoming deranged from the sagging of the gates, the latter are adjustably hung in a peculiar manner. The said gates are each hinged directly to supplemental posts L, which are bolted at M to the ground-posts S S', and further held by bent arms N. Now, if the gate should sag or droop, wedges O are driven between the supplemental posts L and the bent arms N, which has the effect to adjust the supplemental posts L upon the bolts M as pivots, so as to hold the gates higher and compensate for the sagging of the same.

In relation to the merit of the double gate, having hinged sections opening in opposite directions, to which my improvements are applied, it will be seen that this arrangement enables me to use shorter and more compact operating devices, as in passing either in or out it permits the horse to be driven directly up to the gate by simply turning him toward the gate that opens from him.

An advantage, also, that my arrangement of gates with respect to the connecting-rod I has is, that but one gate (No. 1) need be opened for foot-passengers or persons on horseback, because gate No. 1 does not have any effect upon gate No. 2 for opening the same until it (No. 1) has passed over the rod I, and this opens said gate No. 1 far enough to allow the passage of persons on foot or horseback.

Having thus described my invention, what I claim as new, and desire to secure by Letters Patent, is—

1. The connecting-rod I, arranged diagonally, for opening one gate in advance of the other, combined with the pivoted bars G and H, and with the two gates Nos. 1 and 2 hinged to swing in opposite directions, substantially as described.

2. The combination, with a gate-post and a gate, of an adjustable supplemental post, L, hinged to the gate, and fastened to the gate-post by a pivot-bolt at right angles to the plane of the gate, and arranged to be adjusted upon said bolt to compensate for the sagging of the gate, substantially as shown and described.

3. The levers A A', having each a compound or an oscillating and longitudinal movement, in combination with the lever D, the latch E, and the gate No. 1, substantially as and for the purpose described.

LEWIS T. MASON.

Witnesses:
NEWEL BARNES,
C. E. OLLETT.